(12) United States Patent
Leason

(10) Patent No.: US 7,832,646 B1
(45) Date of Patent: Nov. 16, 2010

(54) UNIVERSAL CONTACTLESS GATEWAY FOR POINT OF SALE TERMINAL

(76) Inventor: David Leason, 28 Garey Dr., Chappaqua, NY (US) 10514

( * ) Notice: Subject to any disclaimer, the term of this patent is extended or adjusted under 35 U.S.C. 154(b) by 985 days.

(21) Appl. No.: 11/561,888

(22) Filed: Nov. 20, 2006

(51) Int. Cl.
*G06K 19/06* (2006.01)

(52) U.S. Cl. .................................................. 235/492

(58) Field of Classification Search ............. 235/379, 235/380, 492, 493; 705/40, 41
See application file for complete search history.

(56) References Cited

U.S. PATENT DOCUMENTS

| | | | |
|---|---|---|---|
| 5,477,215 A * | 12/1995 | Mandelbaum | 340/5.61 |
| 5,884,271 A * | 3/1999 | Pitroda | 705/1 |
| 2002/0021001 A1* | 2/2002 | Stratford et al. | 283/74 |
| 2004/0117302 A1* | 6/2004 | Weichert et al. | 705/40 |
| 2005/0004839 A1 | 1/2005 | Bakker et al. | |
| 2005/0171898 A1* | 8/2005 | Bishop et al. | 705/39 |

OTHER PUBLICATIONS

Roy Want, "An Introduction to RFID Technology", Jan.-Mar. 2006, IEEE Pervasive Computing. 25-33.*
Alpha Card Systems, "RFID Cards: Contactless Smart Cards, and Proximity from Alpha Card," alphacard.com/id-cards/rfid-cards. shtml, 5 pages (printed Mar. 3, 2007).
Hanke, Gerhard: "A Practical Relay Attack on ISO 14443 Proximity Cards," University of Cambridge, Computer Laboratory, 13 pages (printed Mar. 3, 2007).
ATMEL Corp., Application Note: "Understanding the Requirements of ISO/IEC 14443 for Type B Proximity Contactless Identification Cards," Atmel.com/literature, 28 pg (Nov. 2005).
Chase, "Introducing Blink" pamphlet, 2 pages (copyright 2006).

Engadget, visitor poll at engadget.com/2005/12/05/poll-should-i-use-my-new-blink-card, including a first set of reader comments following over time, 7 pages, 2005.
Engadget, visitor poll at engadget.com/2005/12/05/poll-should-i-use-my-new-blink-card, including a second set of reader comments following over time, 6 pages, 2005.
Engadget, visitor poll at engadget.com/2005/12/05/poll-should-i-use-my-new-blink-card, including a third set of reader comments following over time, 7 pages, 2005.
Engadget, visitor poll at engadget.com/2005/12/05/poll-should-i-use-my-new-blink-card, including a fourth set of reader comments following over time, 7 pages, 2005.
Engadget, visitor poll at engadget.com/2005/12/05/poll-should-i-use-my-new-blink-card, including a fifth set of reader comments following over time, 8 pages, 2005.

(Continued)

*Primary Examiner*—Thien M. Le
*Assistant Examiner*—Christopher Stanford
(74) *Attorney, Agent, or Firm*—Leason Ellis LLP

(57) ABSTRACT

Gateway for contactless purchase transactions identifies plural transaction cards held by a customer at a point of sale terminal and loads account information into a memory. The customer's payment options are presented and a selection is received through a user interface. Account information associated with the selected card is forwarded to the point of sale terminal for use in the purchase transaction. The memory is cleared of the account data in advance of a next purchase transaction. Optionally, payment options can be displayed concurrently for selection, and one or more of the payment options can be highlighted to encourage its selection, and other messages, offers, and incentives can be displayed to the customer.

21 Claims, 2 Drawing Sheets

OTHER PUBLICATIONS

HOWSTUFFWORKS.com, "How Blink Technology Works," 4 pages (printed Mar. 3, 2007).

SINCE (Secure and Interoperable Networking for Contactless in Europe), Contract IST 2001-33322, WP1 "D1.1 Interoperability," Jul. 2002, 43 pgs.

SIRIT, Data Sheet: "Plug-n-Play RFID Universal Serial Bus (USB 2.0) RFID/NFC Reader," Apr. 2006, 2 pgs.

VIVOTECH, "Products: VIVOnfc Suite Overview," vivotech.com/products/vivo_nfc/index.asp, 2 pages (printed Mar. 3, 2007).

VIVOTECH, "Products: VIVOwallet," vivotech.com/products/vivo_wallet/index.asp, 2 pages (printed Mar. 3, 2007).

VIVTECH, "Products: VIVOpay Overview," vivotech.com/products/vivo_pay/index.asp, 2 pages (printed Mar. 3, 2007).

VIVOTECH, "Products: VIVOPAY 5000," vivotech.com/products/vivo_pay/vivopay_5000.asp, 2 pages (printed Mar. 3, 2007).

VIVOTECH, "Products: VIVOPAY 5000," vivotech.com/collateral/data_sheets/DS_vivopay5000.pdf, 2 pages (printed Mar. 3, 2007).

VIVOTECH, "Products: VIVOnfc Suite 2.0," vivotech.com/collateral/data_sheets/DS_vivonfc.pdf, 2 pages (printed Mar. 3, 2007).

VIVOTECH, "Products: VIVOcard/VIVOfob Overview," vivotech.com/products/vivo_card/vivo_fob.asp, 2 pages (printed Mar. 3, 2007).

* cited by examiner

UNIVERSAL CONTACTLESS GATEWAY FOR POINT OF SALE TERMINAL

FIELD OF THE INVENTION

The present invention relates to automated financial transaction management, and, more particularly, to a wireless interface to a point of sale terminal in support of a credit or debit transaction.

BACKGROUND OF THE INVENTION

In connection with retail purchase transactions, consumers have a choice as to what form they wish to make their payment. The payment can be made in cash if the customer so wishes and has sufficient funds on hand. The payment can also be made using a debit card which deducts the payment amount from an account of the customer which is associated with the debit card being used. Typically, debit cards are linked to a prepaid account or a checking account. Many payments are made by credit card, and it is not uncommon for a customer to carry multiple credit cards as well as one or more debit cards and some cash. It is possible that the customer may, in some circumstances, spread a charge across a number of credit cards and debit cards, with or without a partial cash payment. What is apparent, however, is that the customer has discretion as to what mode to make the payment.

Now it happens to be that purchase transactions that are completed with credit or debit cards subject retailers to commissions that the retailer must pay to the institutions that underwrite payment systems such as VISA®, MasterCard®, American Express®, The Discover Card®. These commissions are generally not visible to the customer, yet retailers can incur fees for accepting these payment mechanisms of up to several percentage points of the entire purchase transaction.

Some retail have their own branded credit cards and provide incentives to customers in order to get the customer to accept and use the retailer's credit card. Third-party transaction fees can be greatly reduced when a customer uses that card instead of some other payment system. However, encouraging the customer to present that card for payment in lieu of other cards is a challenge that retailers continuously face.

While customers may carry on their persons multiple payment systems including retailer-branded cards, the customer retains discretion as to which card to remove from his or her wallet and use at a point of sale. At best, a sales clerk can suggest use of a retailer-branded card or cash, but the customer is the only party that knows which options in his or her wallet are viable or appropriate for a given purchase transaction.

What is needed in the art is an improved gateway between a customer and a point of sale terminal that can assist a customer in completing a purchase transaction in view of the customer's payment options. What would be of further assistance in the art is such a gateway that can assist a retailer in maximizing its profit objective based on at least partial knowledge of the customer's payment options.

SUMMARY OF THE INVENTION

In accordance with one aspect of the invention, a purchase transaction at a point of sale terminal is conducted in a contactless manner by receiving at a gateway account data from a number of transaction cards that have been placed in proximity to the gateway. There can be any number of transaction cards presented. The account data received from each of the transaction cards is loaded into a memory associated with the gateway. One or more payment-options, corresponding to at least a portion of the account data, are presented on a display associated with the gateway. A selection of a payment option is received through a user interface associated with the gateway. The account information associated with the selected payment option is forwarded from the gateway to the point of sale terminal for use in the purchase transaction. The memory is cleared of the account data in advance of a next purchase transaction.

In more particular aspects, the foregoing method can concurrently present at least two payment options on the display. Also, a benefit can be offered for making a selection of a particular account payment option from among the presented payment options. As well, at least one of the payment options can be highlighted relative to others to encourage selection of the highlighted option. The method can be performed during a single session, and can be performed after tallying at least one item in the purchase transaction at the point of sale terminal.

In accordance with another aspect of the invention, a purchase transaction at a point of sale terminal is conducted in a contactless manner by interrogating a number of transaction cards that have been placed in proximity to a wireless RF reader. Account data associated with each of the cards is loaded into a memory. At least a portion of the loaded account data is presented to a user on a display. A selection of one of the plural accounts is received, and the purchase transaction is completed by charging the selected account in an amount determined at the point of sale terminal for the purchase transaction. The memory is cleared of the account data in advance of a next purchase transaction. More particular aspects of this latter method include those described above.

These and other aspects, features and advantages of the invention can be appreciated from the accompanying drawing figures and description of several illustrative embodiments.

DETAILED DESCRIPTION OF CERTAIN EMBODIMENTS OF THE INVENTION

Figure 1:
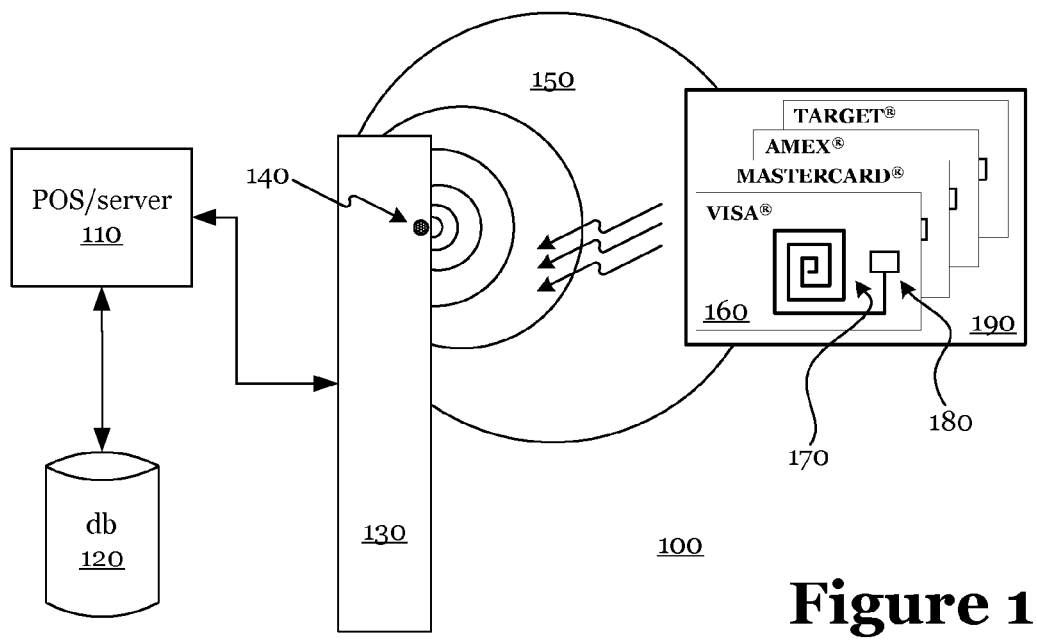
FIG. 1 is a physical block diagram illustrating an arrangement suitable for implementing an embodiment the invention.

By way of overview and introduction, a customer ordinarily reveals one form of payment after selecting it from his or her wallet. Neither the sales clerk nor the point of sale terminal is informed of any other payment mechanism that could have been selected by that customer. However, the universal gateway provided by the present invention enables a customer to have multiple transaction cards interrogated at once, and presents those payment options for selection and completion of a purchase transaction. At the same time, the retailer can, through the gateway, encourage the customer toward a particular payment-option selection among his or her available choices, optionally with advertisements or incentives targeted to the customer.

A number of contactless transaction cards are now accepted at select retail outlets. For example, the J. P. Morgan Chase Blink℠ card, the MasterCard® PayPass™, VISA® Contactless℠ and American Express'® ExpressPay® card are contactless transaction cards that can be read by suitably configured gateways. Early gateways were uniquely configured to process one specific card type, but that is inefficient both in terms of equipment and in counterspace usage. Some providers such as ViVOtech, Inc., Santa Clara, Calif., and Sirit, Inc., Toronto, Canada, have proposed universal readers responsive to single-card presentations. However, as customers acquire and carry more and more contactless transaction cards, the simple "touch" concept loses some of its convenience and charm because one contactless card must be isolated from the rest to ensure that a transaction proceeds with the intended card. The present invention provides a universal gateway and methods in which the customer is presented with payment option choices for selection, in, effectively, a two-step operation: first, a wallet or purse with one or more cards is brought into proximity with a reader, and then a card is selected by the customer. During that process, the customer can be encouraged toward the use of particular cards through highlighting, advertising, or incentives.

The present invention is described in connection with a universal gateway having either near-field communication ("NFC") transponder capability or radiofrequency identification ("RFID") transponder capability, but it should be understood that a gateway can be constructed so as to have additional functionality, including functionality suitable for sensing the presence of credit and debit cards that lack NFC/RFID capability. For example, the gateway can include as part of its interface a magnetic stripe reader, an optical code reader, an infrared reader, or some other variety of inductive or capacitive sensor configured to identify a card that has been appropriately placed near or moved across such interface. For ease of discussion, the following description concerns contactless interrogation using NFC or RFID technology, but the invention applies more generally to any number of interrogation methods.

Referring first to the arrangement of devices 100 shown in FIG. 1, a particular implementation of the invention is described in connection with a purchase transaction at a point of sale terminal 110 within a national retailer, in this case Target® Department Stores. Persons of ordinary skill in the art will appreciate, however, that the steps are applicable to retail transactions at any outlet that accepts credit or debit cards in fulfillment of a purchase transaction, including services providers (for example, restaurants and hotels) that accept credit or debit cards for payment.

The point of sale terminal ("POS" terminal) 110 typically takes the form of a computer-implemented cash register of the type available from a variety of manufacturers including, for example, International Business Machines, Armonk, N.Y. and National Cash Register, Dayton, Ohio. The POS terminal typically has connectivity to a card sensing device that can obtain account numbers and account names from credit and debit cards presented as a payment mechanism to complete a payment transaction. The POS terminal is also connected to logic rules and/or a database 120 which operate upon the data ordinarily processed at a POS terminal to, among other things, translate SKUs and bar codes from products into plain-English item descriptions and prevailing prices, and to process coupons, membership cards, and loyalty program transactions.

In implementations of the present invention, a universal contactless gateway 130 replaces or supplements conventional transaction card sensing devices. The gateway 130 typically is a stand alone unit separate from, yet in two-way communication with, the POS terminal 110. For instance, the gateway 130 can be mounted on a counter within arm's reach of customers ready to pay for their items, with connectivity to the POS terminal routed under the counter. The communication with the POS terminal 110 is preferably both an encrypted and dedicated communication protocol, and the communication interface can be, for example, IEEE 1284 (parallel port), USB or USB 2.0 port, IEEE 1394 ("Firewire"), IEEE 802.11 transceiver variants, Bluetooth transceiver, infrared port, or 10Base-T and 100Base-T Ethernet, or one of a variety of emerging interfaces.

The gateway is a processor-driven unit which includes, among other components, a BIOS, a processor, a local memory such as a random access memory unit, a touch screen display, input/output interface or driver to communicate information to and from the display, a network card permitting communication with the POS terminal 110, receiver circuitry to receive data transmitted from cards over a range of frequencies which match those used by the transponders in the cards 160, and software or firmware that governs the card interrogation, data processing, user interface and interaction with the POS terminal 110. In part, the card/reader interaction can be supported by software and firmware such as Mifare™ available from Philips N.V. In one embodiment, the gateway 130 has slots that couple receiver modules to the data bus, so that additional or different receiver circuitry can be added, as desired, to accommodate the range of frequencies being used in cards in any given locale (e.g., in Japan). The gateway can have a dedicated service port which allows administrator access to the operating system, BIOS and firmware for upgrades, servicing and the like.

In addition, the gateway 130 in the illustrated embodiment includes an amplifier and one or more elements 140 that are configured to radiate a magnetic field in a small volume of space adjacent to the gateway. In one implementation, the amplifier is an alternating-current current amplifier and the element(s) 140 can be a current carrying conductor loop. For ISO 14443 compatibility, an amplitude-modulated 13.56 MHz field ("$f_c$") is used. NFC communications, if utilized, also are at 13.56 MHz (and can support data transfer rates of 424 Kbits/second). Additional or different communication protocols can be supported, including those at other carrier frequencies, by providing a suitable amplifier or set of amplifiers. A magnetic field 150 surrounds the current-carrying conductor, following Faraday's Law, and has a zone of influence within which it can energize through inductive coupling any transponders that are within range. The conductor 140 is preferably oriented and arranged relative to the gateway 130 so that the magnetic field 150 that is established has a size suitable for contactless interrogation of any credit or debit cards 160 that are brought within range.

The magnetic field 150 rapidly diminishes in strength with distance from the gateway. The contactless interrogation of the cards 160 typically is initiated by the customer, in response to bringing the transaction card 160 into proximity or momentary contact with a front surface of the gateway 130. In accordance with the present invention, a customer can bring several transaction cards 160 into the zone of influence for concurrently bringing a plurality of transaction cards 160 into the ready state. These cards can be kept within a wallet or purse ("card holder" 190), so long as the card holder is permeable to magnetic-fields.

Transaction cards 160 that are suitable for contactless interrogation include a wire loop antenna 170. When the antenna 170 is within the zone of influence provided by the magnetic field 150, a voltage is induced in the coil (again, in accordance with Faraday's Law), and the voltage powers-on a microchip 180 which is preferably embedded in the card 160. In this way, power to the microchip 180 is supplied inductively by the gateway 130, and the (credit or debit) card 160 does not require an on-board source of power. Circuitry that is configured in this manner is known as a passive system. On-board capacitors can store charge for use by the microchip 180, which is particularly desirable if Type A signaling is used, in which the communications between the card and the reader utilize on-off keying ("OOK") modulation. The microchip is programmed at the time of issuing the card to include the account number, account holder's name, and optionally further information including information normally encoded in the numbers that are conventionally embossed on a credit or debit card. This can be stored in a memory portion of the microchip, such as a write-once memory. The microchip preferably includes various instruction sets which operate to respond to power-on and clock signals (via a clock extraction circuit for producing a digital clock for driving the microchip 180 at the carrier frequency $f_c$), and any date and time information that may be sensed by the card, with an encrypted or dynamically encrypted output of data to the gateway 130. Among suitable instruction sets and chips are those available in the Mifare™ system. The complexity of the microchip and shape of the wire loop can vary widely. The wire loop antenna is loaded by its supporting substrate to give it an effective electrical length, in wavelengths, which matches to the frequency of operation of the transponder for good signal coupling. The antenna's load can be modulated (Type A), or binary phase shift keying (BSPK) modulation can be performed (Type B), at a subcarrier frequency ($f_c/16$, or 847 kHz) to transmit data from the card to the reader at a data rate of up to about 106 kbps.

Once the microchip 180 has been energized, the card or cards 160 can communicate with the gateway 130 with a very short range transmission (e.g., 4 inches). The transmissions can be modulated and encoded in accordance with ISO 14443-2, type A or B. The underlying communication comprises digital data which identifies, at least, a payment system and an account to charge. The communications can include application protocol data units ("APDU") from an application layer, such as may be constructed in accordance with ISO 7816-4. The data is read out from the chip, preferably in an encrypted form and optionally with additional security measures such as time stamps or biometric information. Standards such as ISO 14443 and 7816 (for contacted integrated circuit cards) exist which describe such communications in detail. There also exist standards and protocols relating to data exchange in connection with contactless purchase transactions, such as those published by the Near Field Communications Forum, Wakefield, Mass.

The gateway 130 operates as a proximity coupling device ("PCD") which can poll its environment to determine the presence of any proximity integrated circuit cards ("PICC") such as transaction cards 160. Polling can be in accordance with ISO 14443-3. Until polled, the cards 160 wait silently. Multiple responses due to the presence of plural cards 160 generally results in collisions. ISO 14443-3, which supports type A and type B signaling schemes, provides a methodology for a reader to handle multiple card responses to a request for data. Type B includes a slotted Aloha method that can be used to activate fifteen PICCs concurrently, with each PICC operating in a respective timeslot, until halted. Type B also includes a probabilistic anticollision methodology which could be employed, if desired. The gateway arbitrates among multiple responses using one of a variety of known methods to avoid collisions and then communicates with any one of the activated cards at a time.

If multiple cards 160 are powered on and in a ready state, they can be held in an anticollision loop. Any of the PICCs can move to an active state by being selected. A PICC is selected by having its entire serial number (Unique ID or UID) called by the reader. Only that card will respond to the UID. The response is a transition to the active state in which APDUs or other data units from the application layer can be exchanged with the reader, optionally with encryption such as specified under ISO 14443-4. That same card can be deselected (e.g., though a halt command or a suitable APDU command) and later returned to the ready state in the anticollision loop (through a wake-up command), for selection again, for example, if needed to complete a purchase transaction because it corresponds to a customer-selected payment option, as discussed below.

The selection process in the presence of multiple cards can proceed generally as follows, as explained in connection with a Type A bit collision detection principle. The gateway 130 requests the UID from any energized cards 160 in their home state (the state prior to being selected). If three cards 160 are present, they respond with their respective UIDs, for example:
 ←PICC1 sends UID, e.g., 01010111 . . . .
 ←PICC2 sends UID, e.g., 01110111 . . . .
 PICC3 sends UID, e.g., 01010100 . . . .

The data stream received at the PCD gateway 130 recognizes the collision (C) as "01C101CC . . . " Thus, a collision at position three prevents unique identification of any card, and so all further bits are ignored for the moment. The PCD gateway 130 then selects a bit value for position three and again sends a select command requesting only cards which have a serial number having "010 . . . ," where "0" is now substituted for the collision value. This results in only two PICCS responding. PICC 2 remains silent as the portion of the UID being transmitted is not directed to it.
 ←PICC1 sends UID, e.g., 01010111 . . . .
 ←PICC2 silent
 ←PICC3 sends UID, e.g., 01010100 . . . .

The data stream received at the PCD gateway 130 this time recognizes the collision (C) as "010101CC . . . " Thus, a collision at position seven prevents unique identification of the responding cards, and so all further bits are ignored for the moment. The PCD gateway 130 then selects a bit value for position seven and again sends a select command requesting only cards which have a serial number having "0101010 . . . ," where "0" is substituted for the collision value. This results in PICC3 responding. PICC 2 and PICC1 remain silent as the portion of the UID being transmitted is not directed to it. Since PICC3 is the only card responding, the PCD knows the entire UID and so a final select command can now be sent to PICC2 which acknowledges the selection and moves to the active state.

Under a Type B anticollision procedure, the selection process in the presence of multiple cards can proceed using one or more methods. Type B cards are not bit synchronous and so collision cannot be detected on a bit level. Rather, cycle redundancy checks ("CRC") are utilized to detect communication errors that may exist in the bytes submitted in response to requests from the gateway, for example, due to collision among multiple responding cards. The CRC_B value can be used to confirm the validity of a frame or byte, by considering the data in the frame, excluding the start of frame, end of frame and CRC_B bits. In answer to a request command from the PCD gateway 130 (REQB), any PICCs in the local field will respond with an ATQB command (N=1). In the event of a collision (simultaneous response), the PCD will separate the PICC transmissions so that each PICC can be singled out and interacted with by the PCD.

First, an application family identifier (AFI) can be contained in the PCD request command to limit responses to those PICCs with applications of the type in the AFI. For example, the AFI high bit $2 identifies the application family for financial cards, such as banking, retail, and electronic purse whereas the high bit $1 identifies the application family for transport cards, such as mass transit, bus and airline. The AFI high bit can be included in the request command to collect responses from PICCs of the designated type (e.g., $20, where "0" retrieves responses from all financial PICCs or $2B, where "B" retrieves a subfamily of financial PICCs). In this way, collisions can be reduced, or even avoided.

Second, the request command can include an integer number, N, which indicates the number of slots being assigned to the anticollision process. When N is greater than "1," the gateway 130 is instructing PICCs to generate a random number, R, having an integer value 1 to N which is used to determine a slot for time-sequenced communication among the responding PICCs. The request command can combine N>1 and AFI commands, as in the following illustration. Suppose that the PCD issues a command REQB (AFI=$20 e N=1). This request polls transaction cards 160 for any cards that are of type financial, regardless of subcategory. If the card holder 190 had multiple cards 160 in his or her wallet or purse, the ATQB response can be as follows:

←PICC 1 Matched AFI, N=1, transmit ATQB
←PICC 2 non-matched AFI, wait for next REQB
←PICC 3 Matched AFI, N=1, transmit ATQB In this example, a collision is detected at the gateway and a further request is transmitted, this time (AFI=$20 e N=4). In response, the PICCs will generate an R value between 1 and 4, such as:

←PICC 1 Matched AFI, randomly select R=3, wait for slot marker for slot 2
←PICC 3 Matched AFI, randomly select R=1, transmit in ATQB slot 1

The software executing in the gateway 130 can select PICC3 and not send further slot markers or can continue sending slot markers. PICC1 will be set to a slot once a slot marker command assigns slot 2 to PICC1, with PICC1 responding with an ATQB in slot 2. At this point, the gateway has completed the anticollision sequence and is able to uniquely select any relevant card (here, PICC1 or PICC3) for communication, e.g., to obtain account data for use in a purchase transaction. This may include further transmissions such as a command to assign a card ID number ("CID") using an ATTRIB command. If CIDs are supported, up to fifteen PICCs can be active at the same time and addressed using the CID number; otherwise, the gateway 130 will place a single PICC in the active state at a time. Transmission from the card 160, in response to a valid command, can comprise a synchronization time (TR1), a start of frame (SOF), several characters of data comprising k data bytes, a two-byte CRC_B, and an end of frame (EOF). A PICC will turn on its subcarrier only when it intends to transmit a response and continue the subcarrier until the EOF has been transmitted. The PCD locks onto the phase of the subcarrier signal to define the logic values (e.g., "1" is during TR1).

It may be desirable to select, interact and then send a PICC to the halted state, as halted PICCs do not participate further in the anticollision loop and so the loop can operate faster once several cards have been halted.

Optionally, the user can have a governor card that manages the handling and interaction of the customer's transaction cards 160. The governor card can be structurally similar to that of the transaction cards, but encoded with an AFI which identifies the presence of that particular type of card. For example, the AFI high bit can be $3 (identification) or another high bit not yet assigned under ISO 14443-3 (presently $9 to $F), and the low bit can be $1 to $F. The governor card, once active, can provide preferences stored on the card to the gateway 130 that govern the way in which the user interface is to interact with the customer. A request command from the PCD can poll for cards of this AFI type, and communication established in order to receive preferences of the user holding the read PICC. In the absence of such a card, default values can be used at the gateway 130. After detecting the presence of the governor card, the gateway can configure the user interface in accordance with established customer preferences, such as language (English, Spanish, etc.), color scheme (no reds/greens), button size (senior-friendly) and sight impaired (audible feedback) settings. Thereafter, anticollision techniques can be utilized in order to identify and communicate with a plurality of PICCs and provide selections to the customer for use in completing the purchase transaction.

As used herein, "interrogation" refers to the steps of energizing a passive device, and bringing it to a selected state free of collisions with other cards such that information can be read from the card through digital transmissions in a wireless manner. The interrogating device is the universal gateway 130.

Figure 2:
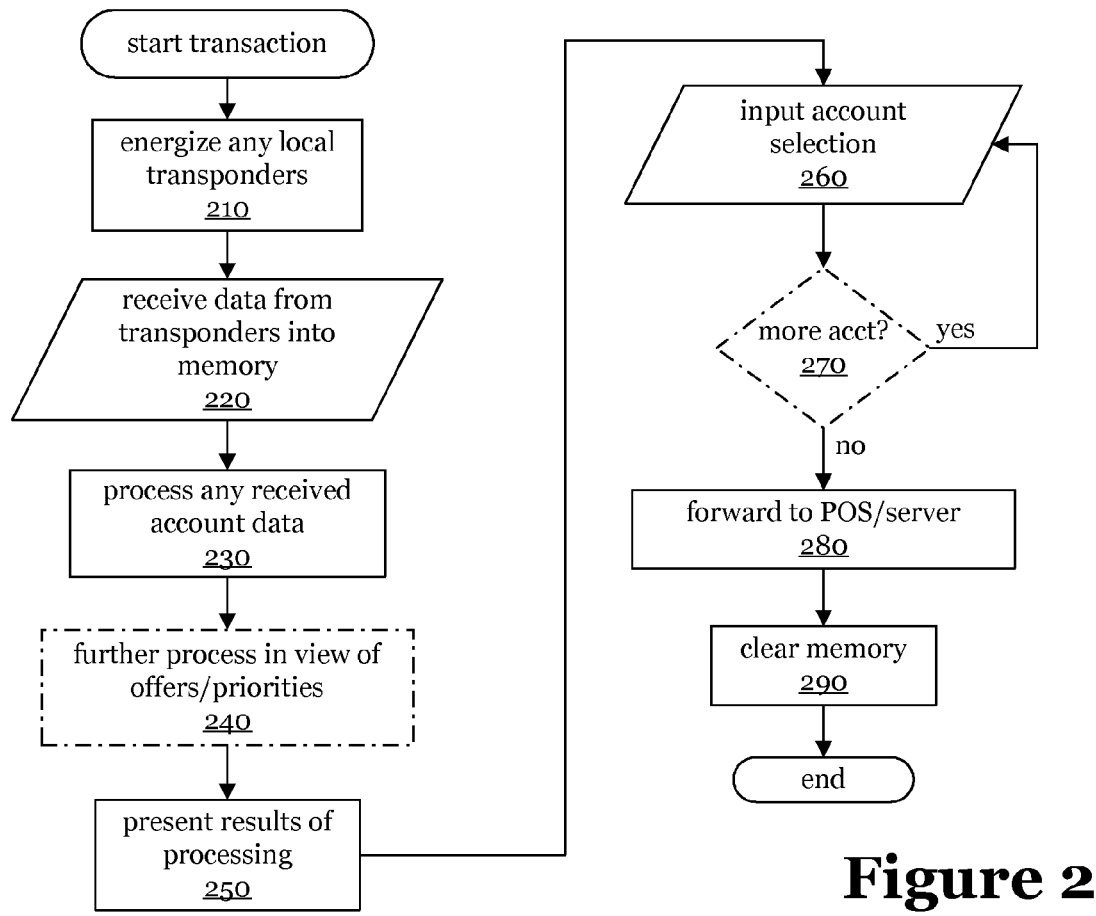
FIG. 2 is a flow diagram illustrating steps that can be taken to implement an embodiment of the invention.

Referring now to FIGS. 1 and 2, a process flow is conceptually illustrated which makes use of an arrangement such as shown in FIG. 1 in connection with a single session with a customer. The process concerns a purchase transaction at the POS terminal 110 at a retailer or service provider. The process flow begins when a customer is ready to make a payment for goods or services ("item") that he or she has selected. The gateway 130 operates to interrogate any credit or debit cards the customer may have for this purchase transaction session. First, the customer brings his or her card holder 190 into a zone of influence for the interrogation to proceed. As indicated at block 210, the transaction cards are energized so that any microchips 180 can locally transmit information to the gateway 130. In the preferred embodiment, the zone of influence includes the magnetic field 150 and the transaction cards 160 are energized through induction. A voltage induced in each respective coil 170 provides a sufficient amount of power to each respective microchip 180 to enable the microchips to transmit data including the account data to the gateway 130 at an operative frequency of that microchip, once any collisions have been avoided as discussed above. ISO 14443 specifies a frequency of 13.56 MHz which offers a balance of suitability for inductive coupling and a resistance to environmental interference. A transaction card 160 operating under this ISO standard thus responds to the gateway 130 by transmitting data from the card at 13.56 MHz, preferably in an encrypted form, as indicated at block 220. A card operating at a different frequency responds to a modulated signal at its operating frequency, and the gateway 130 can include a wide band receiver or multiple pass-band receivers that receive data transmissions at block 220 over a variety of frequencies and in any number of encryption formats suitable for the task. Thus, the gateway 130 contactlessly receives digital transmission of the account data from the energized cards 160.

The data received at block 220 is loaded into a memory associated with the gateway 130. The memory preferably provides a workspace that is valid during the purchase transaction session with the customer, and is erasable thereafter. For each card 160 providing data to the gateway 130, respective account data is loaded into the memory and managed discrete from any other account data. For instance, the account data for each of multiple cards 160 that has been interrogated during a session with the customer populates rows or columns of a data table constructed within the memory of the gateway 130, under control of the gateway's instruction set. Alternatively, the account data particular to each card can be an account object instantiated from a class of accounts.

The data in the memory of the gateway is processed prior to presentation to the customer, as indicated at block 230. Processing by the gateway preferably includes examining the contents of its memory to determine, for each card that has responded during the purchase session, the payment system to which the card belongs (Visa, Mastercard, etc.). For example, most national credit-card systems follow ANSI Standard X4.13-1983 in which a multi-digit number can identify the payment system to which the card belongs and the account associated with that card. The first digit identifies the system. A "3" in this position signifies a travel or entertainment card such as American Express or Diners Club. A "4" in this position signifies Visa, whereas a "5" signifies MasterCard and a "6" signifies Discover Card. The remaining digits vary by system. American Express card numbers start with "37" in the first two positions, with digits three and four indicating the card type and currency, digits five through eleven providing the account number, digits twelve through fourteen being the card number within the account, and digit 15 is a check digit. Visa International has Digits two through six identifying the bank number, digits seven through up to fifteen identifying the account number, with the final digit being a check digit. MasterCard has a variable number of digits starting at position two identifying the bank, the next digits identifying the account number, and a sixteenth digit being a check digit. The data received from the cards 160 and stored in the gateway's memory can include the account information normally encoded in the embossed digits of the card as well as other information as may be conventionally encoded on a magnetic stripe such as the account holder's name. In other words, "account data" is a set of information which includes the identity of an account that can be charged. If object oriented programming is used, a particular account object can have a set of attributes having values which correspond to the data in the embossed card number. These values can be inspected and used by methods of that object and other objects. Among other attributes, the state of an account object can include values set to correspond to a determined payment system and an icon associated with that payment system, as discussed below.

Once the account has been determined, additional pre-processing can be performed on the data in the memory, if desired, to determine whether any of the accounts linked to the interrogated cards have limits or balances which make the card not-suitable for the current transaction session before prompting the user that a particular card is available for use in the current transaction. A debit card, for example, would not be suitable for the current transaction if there are no longer any funds associated with that account. Likewise, an overdue or maximum-limit reached on a particular credit card might render it unsuitable for the current transaction. The determination of suitability is made with reference to information that can be provided in real time, during that session, over the communication link through the POS terminal or another server 110 that has access to account balances and status.

Still further processing can be performed, at block 240, in some implementations to encourage customers to select one payment mechanism over another, or to implement a strategy of ranking or prioritizing certain card listings and presentations over others. This further processing is discussed below.

Figure 3A:
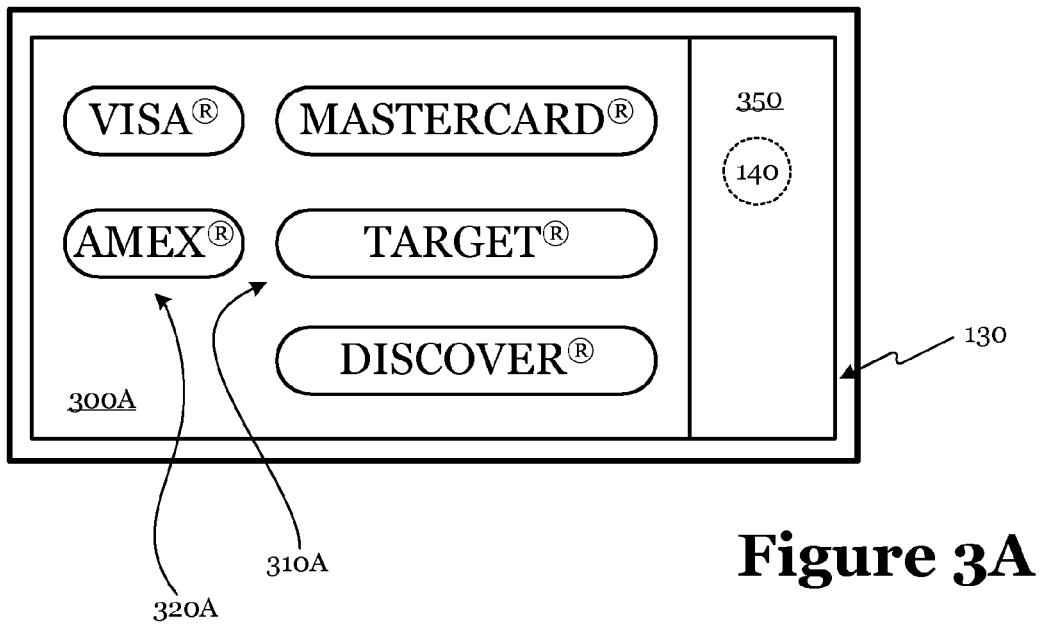
FIG. 3A is a sample user interface for a universal gateway in accordance with an embodiment of the invention.

At block 250, a set of payment options are presented in a display window 300A of the gateway 130 (see FIG. 3A). Each payment option that is displayed corresponds to an account associated with the account data that was identified as a result of the interrogation process. The selections that appear in the display window can be a result of a customer moving the card holder 190 or one or more individual cards 160 into the vicinity of area 350 of the gateway, which overlies the conductive element 140 (from which the magnetic field 150 emanates). Preferably, each payment option is presented using an icon such as a logo associated with the payment system or a text string (e.g., "VISA," "Discover Card," etc.). A set of icons can be stored in the memory and associated with the payment options available for the set of interrogated cards. One way for associating an icon with a particular account data includes executing program code that compares one or more digits in the account data to reference values and assigning icons based on a match. Thus, for example, if the first two digits of one of the account data match a reference value "37," then an AMEX icon is associated with that account and payment option, and if a first digit of one of the account data matches a reference value "4," then a VISA icon is associated with that account and payment option. Optionally, each payment option is presented in the display window 300A in a customer-selectable button object which includes the icon. The button-object can include a particular stored icon as a value for one of its properties, or can have a method that displays a particular icon as a function of the first digits included in the account data value.

In the illustrated example, at least five contactless interrogations resulted in the concurrent display of icons corresponding to five different payment options for the current transaction session, including among the choices a Target Department Stores account 310A and an American Express account 320A. The selections in the window 300A preferably are those that were identified as a result of the interrogation at steps 210 and 220. The selections presented on the display can also be a subset of the interrogated cards. As an example, the subset can be defined after determining which cards are linked to accounts that are suitable for the current purchase transaction.

At block 260, the customer selects a payment option to use in completing the purchase transaction of the current session. An account is preferably selected by interacting with the display 300A, e.g., by touching the screen at the location of the account the customer has chosen to use in the purchase transaction. This can be implemented, for example, by defining the account objects or payment-option objects to represent each account in the display window 300A and providing methods for those objects that respond to an on-click event. Discrete buttons can be provided on the gateway in addition to the display 300A, or instead of providing touch-screen capability.

Optionally, the customer can divide a purchase transaction across more than one account through suitable prompts provided in the window 300A (not shown). Optionally, a test such as indicated at block 270 can be made to determine whether more than one account has been selected. The customer can indicate a desire to split a transaction through a suitable control provided on the display 300A, or by informing the sales clerk who can make provision for this at the POS terminal 110.

Once the account selection has been made, the account information is forwarded to the POS terminal 110 for processing, as indicated at block 280. The forwarding of account information can be done in response to an on-click event upon a displayed button object representing a respective payment option, or in response to receipt of a payment option through a discrete button. Processing by the POS terminal includes sending the proposed purchase amount, as determined at the POS terminal, and card information to a server operated by the card issuer or card-underwriting bank, and receiving an approval or denial of transaction code. Card processing to complete a purchase transaction forms no part of the present invention and is not described further.

Having forwarded the selected account information to the POS terminal 110, the local memory of the gateway 130 is cleared of all of the previously loaded account data, as indicated at block 290. The clearing function can take place automatically after information has been forwarded from the gateway 130. Alternatively, the clearing can await receipt of an acknowledgement at the gateway 130 that the account information has been received from the POS terminal 110. Clearing the memory ends the customer's session at the gateway.

The process flow then ends, awaiting the commencement of a new interrogation session, as can occur in response to further transaction cards 160 entering the zone of influence of the magnetic field 150.

Referring again to the presentation in FIG. 3A, each payment account is given generally equal prominence; however, the optional further processing at block 240 can provide a basis for highlighting one or more payment options relative to the others, as described next in connection with a sales transaction taking place within a Target® department store. The further processing at block 240 can use the identifications of payment systems, from which the customer in the current transaction can choose, to shuffle the location of the presentation of each payment option on the display as well as the presentation of each button-object. A rule base can be established and be used by the processor of the gateway 130 to prioritize the display in accordance with the retailer's requirements. Thus, for example, the retailer may be able to avoid or reduce transaction fees when it completes a purchase transaction using its own transaction card rather than some other payment system. Depending on the fee agreements with other card providers, the retailer can offer an incentive to the customer to complete the current purchase transaction using the retailer's transaction card rather than any other. The further processing of block 240 causes the information previously displayed in window 300A to be arranged in a different way, and optionally in multiple windows.

Figure 3B:
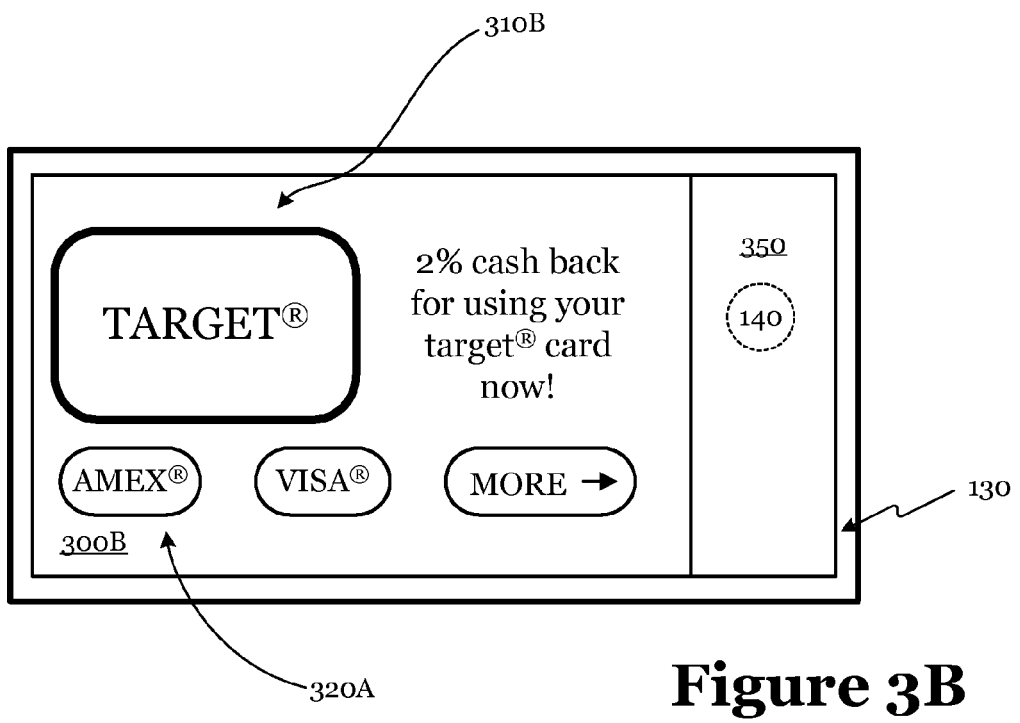
FIG. 3B is a sample user interface for a universal gateway in accordance with another embodiment of the invention.

Referring now to FIG. 3B, window 300B shows the button-object 310B for the retailer's account being highlighted relative to others (as shown, the highlighting is a larger size compared to other button-objects, but "highlighting" can also include animations, colors, fonts and font characteristics, sounds, or a combination of these settings and features). Window 300B also shows an optional incentive to the customer in the form of a message informing the customer of a cash-back incentive for selecting that payment system. The incentive can be a publicly available promotion, can be an offer based on the customer's purchase transaction history with Target®, can be in response to particular item purchases in the present session, can be in response to the total value of the present transaction, or a combination of these factors.

Optionally, the gateway forwards the terms of the offer or benefit or incentive to the POS terminal 110 for use in the purchase transaction (e.g., to adjust the total amount due for the items in the purchase transaction, to credit membership awards to the customer, to enter the customer into a sweepstakes, etc.).

Some of the other button-objects can also appear in the main window 300B with lesser prominence than the Target® button-object 310B, such as the AMEX® button-object 320A. Also one payment option can be a "more" button-object which is displayed and must be selected prior to displaying the remainder of the shuffled payment mechanism options. Thus, window 300B can highlight one payment mechanism over others to encourage selection by the customer.

When the further processing at block 240 is performed, the retailer can shuffle the payment mechanisms discovered from the interrogation of the transaction cards 160 to provide offers and promotions in accordance with its own offerings. It should be understood that a payment system can provide an incentive to the retailer to promote its transaction card over others, and that any incentive to the customer can be based on using that payment system for the purchase transaction in lieu of any other. In this case, the incentive can be any of the factors noted above, as well as in view of the customer's purchase transaction history using that payment system at any number of retailers and service providers or a combination of this factor and the previously discussed factors.

The customer can benefit if two different payment systems compete with one another for the current purchase transaction through incentives offered to the customer. Optionally, the benefit can be offered to the customer only after the customer has selected to pay for the transaction using a payment system not associated with the benefit sponsor. In this case, the benefit can be offered to the customer, to accept or deny, with the acceptance resulting in a replacement selection being received of the benefit-sponsor's payment system and a denial resulting in the purchase transaction being completed using the first-selected payment system. If the benefit-sponsor's card is selected for use in the current transaction, then the account information associated with the replacement selection is forwarded from the gateway to the point of sale terminal. Optionally, the terms of the offer or benefit or incentive can be forwarded to the POS terminal 110 for use in the purchase transaction, as noted above.

The retailer can benefit through the equivalent of a banner or click-through advertisement fee for presenting such offers or having the customer select the offer. Further, ads can be presented on a targeted or general basis independent of the card selection itself, through the user interface of the gateway 130, providing a new revenue source for the retailer.

It should be understood that benefit offerings at a given retailer can be consigned exclusively to a particular payment system such that the customer has the option of using any of the payment systems identified in FIG. 3B, but only one payment system can provide ads, be highlighted, or both, during the term of exclusivity.

Several of the features of one embodiment or arrangement described herein can be used in other embodiments or arrangements to equal advantage and the foregoing specification should be read with that understanding.

While the present invention has been described with respect to a certain embodiments thereof, it is not so limited. The detailed description is presented to enable one of skill in the art to practice the invention and to disclose the best mode known to the inventor as of the date of filing this patent application. The invention more broadly encompasses systems and methods defined by the recitations in the claims appended hereto and the equivalents of such recitations, and is not restricted to the description of any particular embodiment or alternative arrangement described herein.

I claim:

1. A method for conducting a purchase transaction at a point of sale terminal, comprising the steps of:
    contactlessly receiving at a gateway associated with the point of sale terminal, and in a collision-avoiding manner, account data from each of a plurality of individual transaction cards simultaneously placed in proximity to the gateway, each of the plurality of the individual transaction cards having an antenna for communication of the account data therefrom;
    loading the account data received from each of the plurality of transaction cards into a memory associated with the gateway;
    presenting payment-options, corresponding to the plurality of individual transaction cards that have been contactlessly received at the gateway, on a display associated with the gateway;
    receiving a selection of a payment option through a user interface associated with the gateway;
    forwarding account information associated with the selected payment option from the gateway to the point of sale terminal for use in the purchase transaction; and
    clearing the memory of account data from each of a plurality of individual transaction cards in advance of a next purchase transaction.

2. The method of claim 1, including the additional steps of processing the account data, and, a result of the processing step, offering on the display associated with the gateway a benefit for selecting a particular account payment option from among the presented payment options.

3. The method of claim 2, wherein performance of the selection-receiving step results in a first payment option selection, and wherein the offering step is made to the user after the receiving the first payment option selection, the method including the additional steps of:
    receiving a replacement selection of a payment option through a user interface associated with the gateway; and
    forwarding the account information associated with the replacement selection from the gateway to the point of sale terminal for use in the purchase transaction.

4. The method of claim 3, including the additional step of forwarding terms of the benefit to the point of sale terminal for use in the purchase transaction.

5. The method of claim 1, including the additional steps of processing the account data, and, as a result of the processing step, highlighting on of the at least two presented payment options relative to at least one of the remaining payment options.

6. The method of claim 1, including the additional step of processing the account data associated with each respective transaction card so as to determine a respective payment system, and wherein the presenting step presents one respective payment system for each of the one or more payment options.

7. The method of claim 1, wherein the memory associated with the gateway comprises at least a local memory of the gateway, the method including the additional step of storing one or more icons in the local memory, and wherein, for each payment option, the presenting step includes presenting a respective stored icon as the payment option.

8. The method of claim 7, including the additional step of associating at least the portion of the account data corresponding to the one or more payment options with the respective stored icon.

9. The method of claim 7, wherein the selection-receiving step comprises interaction with a button-object on the display, and wherein the button-object contains the presented respective stored icon as the payment option.

10. The method of claim 1, wherein the presenting step comprises presenting the one or more payment options as respective selectable button objects, and wherein the selection-receiving step comprises interaction with at least one of the button-objects on the display.

11. The method of claim 1, wherein the contactlessly-receiving step comprises the step of interrogating the plurality of transaction cards, whereby each transaction card is energized and thereafter transmits respective account data to the gateway.

12. The method of claim 1, wherein the interrogating step comprises transmitting from the gateway a short-range magnetic field.

13. The method of claim 1, wherein the step of clearing the memory is performed in response to a signal from the point of sale terminal.

14. The method of claim 1, including the additional step of processing the account data, wherein the presenting step comprises selectively presenting the one or more payment options in accordance with operation of a rule base and further to the processing step.

15. The method of claim 14, wherein the rule base operates to determine a suitability of each loaded account data for the purchase transaction so as to selectively present the one or more payment-options that are determined to be suitable.

16. The method of claim 14, wherein the rule base operates to rank or prioritize the presentation of the one or more payment-options.

17. The method of claim 1, wherein the selection-receiving step comprises receiving a first payment option selection and a second payment option selection and wherein the forwarding step forwards the first and second payment option selections for use in the purchase transaction.

18. The method of claim 1, including the additional step of decrypting the contactlessly-received account data prior to the loading step.

19. The method of claim 1, wherein each of the steps occurs during a single session and after tallying at least one item in the purchase transaction at the point of sale terminal.

20. A method for conducting a purchase transaction at a gateway connected to a point of sale terminal, comprising the steps of:
    interrogating, in a collision-avoiding manner, a plurality of individual transaction cards simultaneously placed in proximity to a wireless radio frequency (RF) reader, each of the plurality of transaction cards having an antenna for communicating account data therefrom;
    loading account data associated with each of the transaction cards into a memory associated with the gateway;
    presenting at least a portion of the loaded account data concerning at least two of the transaction cards to a user on a display as selectable accounts;
    receiving a selection of one of the selectable accounts;
    completing the purchase transaction by charging the selected account in an amount determined at the point of sale terminal for the purchase transaction; and
    clearing the memory associated with the gateway of account data in advance of a next purchase transaction.

21. A method for conducting a purchase transaction with a customer during a single session at a point of sale terminal (POS), comprising the step of:

providing a gateway that comprises a processor, code executing in the processor, a local memory, a touch-screen display, an interface to communicate information to and from the touch-screen display under control of the code, a network card for communication with the POS, and circuitry to receive data transmitted from transaction cards over a range of radio frequencies (RF), wherein the code configures the processor and is operative to:

(a) interrogate at least two transaction cards that have been simultaneously placed in proximity to a wireless RF interface that is connected to the POS during the course of the purchase transaction, each of the transaction cards having an antenna for communicating account data therefrom;

(b) concurrently bring the interrogated transaction cards into a ready state for communication in a collision-avoiding manner;

(c) load account data associated with at least two of the transaction cards into the local memory;

(d) process account data within the local memory in accordance with a rule base used by the processor;

(e) arrange a presentation to the customer of selectable accounts concerning at least two of the transaction cards on the touch-screen display of the gateway in response to step (d);

(f) receive a selection of one of the selectable accounts;

(g) communicate at least a portion of the account data of the selected account to the POS for use in the purchase transaction; and (h) clear the local memory of the loaded account data in advance of a next purchase transaction, wherein the code comprises firmware or software.

\* \* \* \* \*